Feb. 22, 1966     E. L. PIERSON     3,235,975
VISUAL EDUCATION DEVICE FOR ILLUSTRATING MATHEMATICAL CONCEPTS
Filed June 11, 1963     3 Sheets-Sheet 1
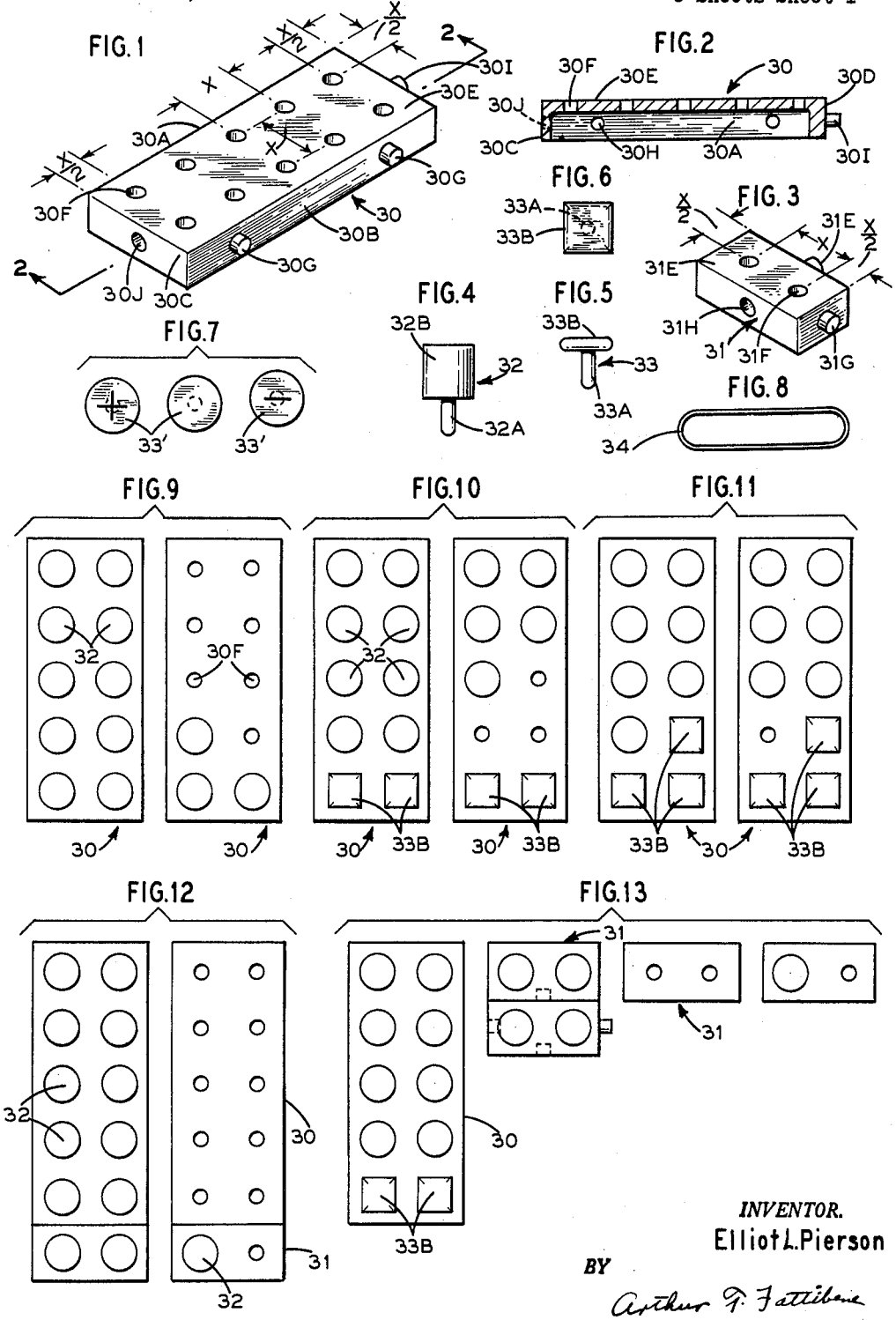
INVENTOR.
Elliot L. Pierson
BY
Arthur G. Fattibene
ATTORNEY Feb. 22, 1966  E. L. PIERSON  3,235,975
VISUAL EDUCATION DEVICE FOR ILLUSTRATING MATHEMATICAL CONCEPTS
Filed June 11, 1963  3 Sheets-Sheet 2
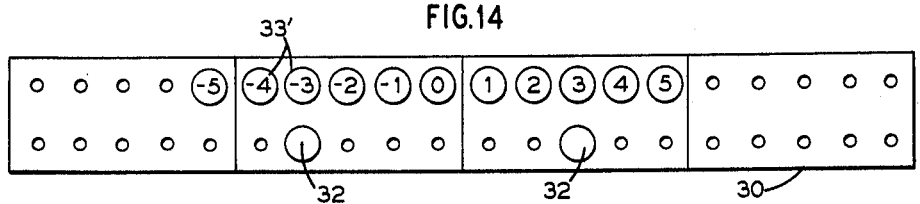
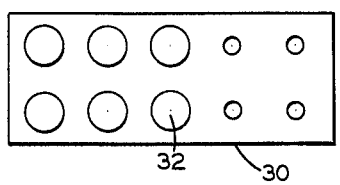 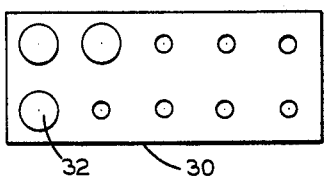 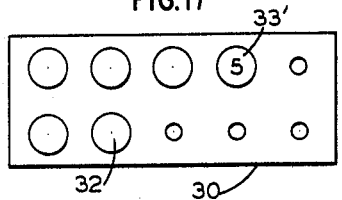
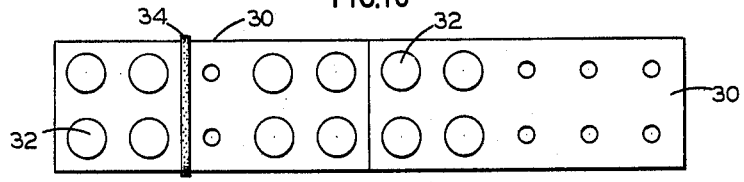
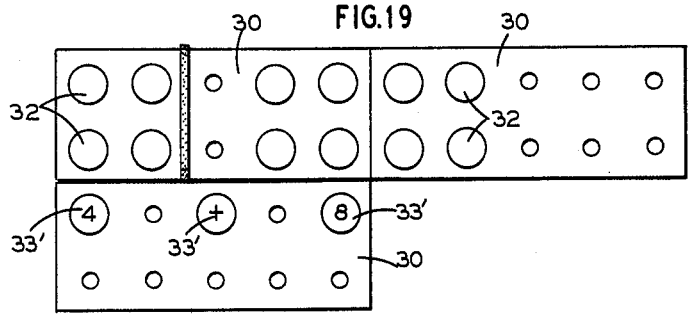
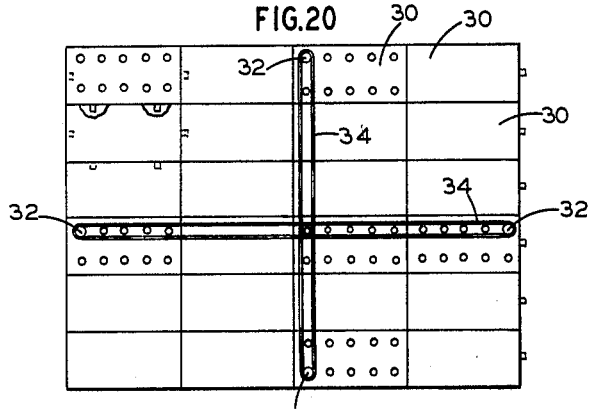
*INVENTOR.*
Elliot L. Pierson
ATTORNEY Feb. 22, 1966  E. L. PIERSON  3,235,975
VISUAL EDUCATION DEVICE FOR ILLUSTRATING MATHEMATICAL CONCEPTS
Filed June 11, 1963  3 Sheets-Sheet 3

INVENTOR.
Elliot L. Pierson
BY
Arthur F. Fattibene
ATTORNEY

United States Patent Office 3,235,975
Patented Feb. 22, 1966

3,235,975
VISUAL EDUCATION DEVICE FOR ILLUSTRATING MATHEMATICAL CONCEPTS
Elliot L. Pierson, 180 Rose Hill Road, Fairfield, Conn.
Filed June 11, 1963, Ser. No. 287,037
4 Claims. (Cl. 35—30)

This invention relates in general to an education device and more specifically to a visual education device for teaching and illustrating various mathematical concepts and operations.

Heretofore, considerable difficulty has been encountered in teaching pupils and students at the various grade levels basic mathematical concepts so that they can be readily and quickly comprehended. This is due to the fact that many of the basic mathematical operations have heretofore been taught in a rather illusory manner, i.e. there was nothing tangible by which the student could see, feel or operate in accordance with the basic mathematical operation being taught. The difficulty of teaching basic mathematical concept is especially aggravated in the lower or elementary grades as a result of the immaturity of the pupils in these grades. For this reason, the teaching of mathematics has always been a rather slow, tedious process. Experience has shown that many students fail to appreciate math or go on to higher forms of mathematics for the simple reason that they have failed to grasp or comprehend the basic mathematical operations and concepts. Consequently, only a relatively small percentage of the students have qualified to go on to higher mathematics. Efforts have been made to develop visible aids to enhance the teaching of mathematical concepts and operations. However, the known aids have had only limited application, and were generally useful for teaching only the most simple and elementary of functions.

Therefore, it is an object of this invention to provide a set of instructional devices having greater versatility than any of the known devices and which can be used to help students at the various grade levels to visualize and understand the mathematical concepts and/or operations taught at such grade levels.

Another object of this invention is to provide a device that can be seen, touched and/or manipulated by the student allowing more of the senses to be used in the process of discovering, working or practicing a mathematical principle or fact.

It is another object of this invention to provide a visual educational device that is versatile in its uses and applications so as to function as an instructional aid for most of the more important topics of mathematics.

Another object of this invention is to provide a set of instructional devices which is relatively simple in structure, relatively inexpensive to fabricate, and positive in operation.

Still another object of this invention is to provide a visual educational device which has a multiple of uses and applications and which is basically many devices combined into one operating set in which the various component parts thereof can be readily arranged and rearranged to form a variety of aids such as for example, number lines, co-ordinate planes, a snap board for demonstrating the basic operations of arithmetic and its properties, holders for place value illustrations to any desired number base, means for constructing and illustrating different geometric shapes, aids for making number sentences, and also aids for illustrating units and fractional parts thereof.

In accordance with this invention, the above objects and other features and advantages are readily attained by a visual educational device which comprises essentially of a plurality of holders which can be detachably connected one to another so as to form a plurality of varying types of visual aids. Accordingly, each of the holders comprises essentially of a block formed of any suitable materials which has formed therein a series of receptacles adapted to receive identifying pegs or plugs for illustrating a given mathematical concept or operation. Each of the respective holders is provided with complementary interlocking means whereby several of the holders may be detachably connected one to another to form any of several different visual aid boards.

In order to facilitate the use of the device of the instant invention in certain systems of numeration, such as in the binary or duodecimal systems, an auxiliary holder is provided. The auxiliary holder comprises essentially of a block provided with complementary interlocking means for adapting it to be detachably connected to either the basic holder or to each other. Accordingly, the interlocking means of the respective holders are similar and complementary. The receptacles in each of the basic holders and auxiliary holders are uniformly spaced so that when the respective holders are interlocked one to another to define a given aid board, the spacing between the receptacles of the board thus formed is uniform throughout.

Operatively associated with the respective holders are a series of pegs and blanking plugs. The arrangement is such that the pegs are provided with a stem portion by which they are fitted in the receptacles of the respective holder. The arrangement is such that the respective heads of the pegs extend up above the surface of the holder. The blank plugs each comprise a flat head and connected stem, the latter of which is adapted to be received in the receptacle of the respective holders so that the head portion thereof lies substantially flush with the plane of the holder. The purpose of the plug is to provide means for blanking off one of the receptacles of a given holder as may be required to construct a given aid board. If desired, the heads of certain of the plugs may also be provided with identifying indicia to illustrate certain mathematical symbols. For example, mathematical symbols such as the addition, substraction, division or multiplication signs and/or the numbers or letters of the alphabet may be imprinted on the heads of some of the plugs. The instant set also contemplates the use of elastic bands for grouping several of the pegs to illustrate certain operations. It is further contemplated that the bands may be formed of different colors, each color representing a given operation, as for example, addition, multiplication, subtraction or division.

A feature of this invention resides in the provision that each of the respective holders is provided with complementary interlocking means so as to effect the arrangement and rearrangement of the holders into a plurality of different board or aid forms necessary for illustrating and teaching any of several various mathematical operations.

Another feature of this invention resides in the provision that the educational device is readily adapted for teaching and illustrating various mathematical operations, as for example, place value, a number line or scale, unit and fractional models, counting, number and numeral recognitions, basic mathematical operations, as for example, subtraction, addition, multiplication and division, analytical geometry, number sentences, field properties, and geometric models and the like.

Another feature resides in coloring the pegs of different colors for illustrating signed number situations.

Other features and advantages will become more readily apparent when considered in view of the drawings and specification in which, FIGURE 1 is a three dimensional view of a basic holder of the educational device in accordance with the instant invention.

FIGURE 2 is a cross sectional view taken along line 2—2 of FIG. 1.

FIGURE 3 is a three dimensional illustration of an auxiliary holder.

FIGURE 4 is a side elevation view of a peg which constitutes a component part of the instant educational device.

FIGURE 5 is a side elevation view of a blanking plug which constitutes a component part of the instant educational device.

FIGURE 6 is a plan view of FIG. 5.

FIGURE 7 is a modified plan view of several variations of the blanking plug construction of FIG. 5.

FIGURE 8 illustrates an elastic band which constitutes a component part of the instant device.

FIGURE 9 is a diagrammatic showing of two basic holders and pegs being utilized for illustrating a place value in teaching numerations of number 13 in base 10.

FIGURE 10 illustrates diagrammatically the function of the holders and pegs in teaching numeration of the number 13 in base 8.

FIGURE 11 illustrates diagrammatically the use of the holders in teaching numeration of number 13 in base 7.

FIGURE 12 illustrates diagrammatically the use of the basic holder and auxiliary holder to teach numeration of the number 13 in base 12.

FIGURE 13 illustrates diagrammatically of the use of several of the respective holders for teaching numeration of number 13 in base 2.

FIGURE 14 illustrates a diagrammatic arrangement of the respective holders to define a number line.

FIGURE 15 illustrates the use of the holder in teaching counting in the very early elementary grades.

FIGURE 16 illustrates the use of the holder for teaching number recognition in the early primary grades.

FIGURE 17 illustrates the use of a holder of the instant invention for teaching and illustrating numeral recognition in early primary grades.

FIGURE 18 illustrates diagrammatically the use of the various components of the instant visual educational device for illustrating and teaching basic operations, as for example, addition.

FIGURE 19 illustrates the utilization of the respective component parts of the instant visual educational device for teaching and illustrating basic operations written with numeral and operational symbols.

FIGURE 20 illustrates the arrangement of the respective component parts of the instant visual educational device for teaching and illustrating analytical geometry operations.

Figure 21:
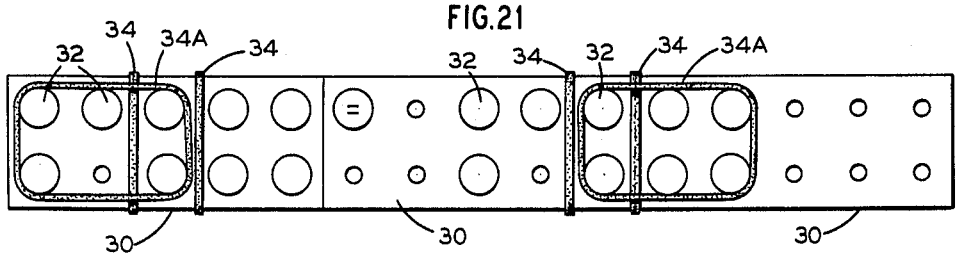
FIGURE 21 illustrates the utilization of the respective component parts of the instant visual educational device for illustrating field properties.

Referring to the drawings, the visual educational device for teaching and illustrating various mathematical concepts and operation, in accordance with this invention, comprises essentially a plurality of basic holders 30, auxiliary holders 31, a series of pegs 32, a plurality of blanking or flat headed plugs 33 and a number of elastic bands 34. Any number of the foregoing respective component parts 30 to 34 may be utilized in a given set.

As shown in FIGS. 1 and 2, the basic holder 30 comprises a block which is substantially rectangular in configuration. It will be understood that the holder or block 30 may be formed of any suitable material, as for example, wood, metal or plastic. However, plastic is preferred for reasons of economy and ease of manufacture. Essentially, each of the basic holders 30 are alike in construction.

The basic holder or rectangularly shape block 30 is formed with opposed longitudinal edge portions 30A, 30B and opposed transversely extending end edge portions 30C, 30D. In the illustrated embodiment, it will be noted that the upper surface 30E of the block is circumscribed by depending wall portions which define the longitudinal edge and end portions of the block. The arrangement is such that when the block 30 is positioned on a flat surface, e.g. a desk or table and the like, the upper surface 30E thereof is spaced above its supporting surface due to the depending circumscribing wall portions.

In accordance with this invention, the upper surface of the block is provided with a series of receptacles, holes or apertures 30F. As shown, the respective receptacles 30F are disposed in two rows, each containing five receptacles each. The arrangement is such that the spacing between center lines of adjacent receptacles is equal to a dimension X, whereas the spacing between the center lines of the respective receptacles 30F and the outer periphery of the block is $$\frac{X}{2}$$

that is, the spacing between the edges of the block and the center line of the end receptacles is equal to one half the distance between the center lines of any pair of adjacent receptacles. Thus, it will be apparent that when any two or more blocks 30 are detachably connected as will be hereinafter described to form any of several of the visual aids in accordance with this invention, it will be noted that the spacing between the respective receptacles 30F of the connected holders 30 are uniform throughout, except for the spacing between the receptacles next adjacent the peripheral edge portion and the peripheral edge of the assembled board or aid.

In accordance with this invention, each of the respective basic holders 30 is provided with complementary interlocking means so that two or more of the respective holders may be readily releasably connected in either side by side and/or end to end relationship with respect to one another. In the illustrated embodiment, the complementary interlocking means comprises co-operating male and female components formed integral in the respective edge portions of the individual holders or blocks. As for example, as shown in FIGS. 1 and 2, one longitudinal edge portion 30B of the block 30 is provided with laterally projecting male bosses 30G and the opposite edge portion 30A with complementary female sockets 30H. Likewise, one of the end edge portions 30D of the block is provided with a similar male projection 30I whereas the opposed end edge portion 30C of the block 30 is provided with a complementary female socket or hole 30J. Thus, it will be apparent that when two similar holders 30 are disposed in either side by side or end to end relationship, the male locking boss or member 30G or 30I of one holder is adapted to be received in the corresponding and complementary female sockets 30H or 30J respectively located in the adjacent edge portion of the next adjacent block whereby the two are detachably connected in abutting edge to edge or end to end relationship, as for example, as is schematically illustrated in FIGS. 14, 18, 19 and 20, for example.

Figure 24:
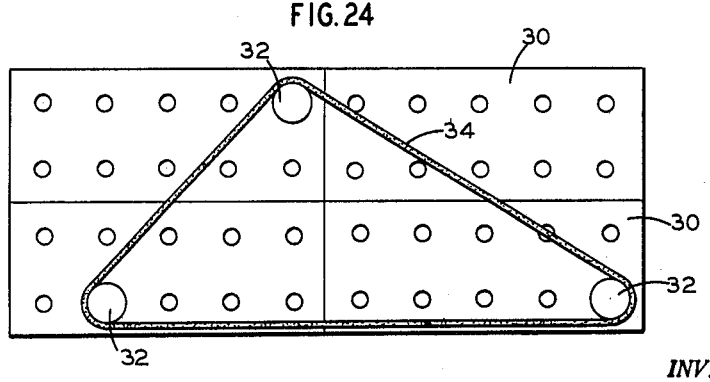
FIGURE 24 illustrates the operation of the respective component parts of the instant visual educational device for teaching and illustrating geometrical models.

With the construction described, it will be apparent that the respective basic holders 30 due to the interlocking means formed about the respective side and end edges thereof, permit several holders to form any of a variety of boards or aids, such as the number line of FIG. 14, a co-ordinate plane of FIG. 20, snap board for demonstrating basic operations of arithmetic and their property, as in FIGS. 18 and 19, holders for place value illustrations, as shown in FIG. 13, and boards for constructing different geometric shapes as illustrated by FIG. 24. Also, the holders are useful in forming units for illustrating the fractional component parts thereof.

Included in the visual aid or set of the instant invention are a plurality of auxiliary holders 31 which are constructed similar to that of the basic holder herein described, but differ therefrom in that they are smaller in length and are provided with only two receptacles 31F in the upper surface 31E thereof. The primary use of the auxiliary holders 31 is to facilitate the utilization of the basic holders 30 in certain systems of numeration such as for example, in the binary or duodecimal systems. Other uses to which the auxiliary holders 31 may be utilized are for illustrating fractional parts of units.

As shown in FIG. 3, the auxiliary holder 31 comprises a rectangular block which is provided with a pair of longitudinal sides edges and opposed transversely extending end edges. It will be noted that the longitudinal edge of the auxiliary block is equal to the width of the basic holder. Also, it is to be noted that the auxiliary holder 31 is also provided with complementary interlocking means formed in the peripheral edge portions and which are similar to those described with reference to FIGS. 1 and 2. As shown in FIG. 3, the opposed edge portions are provided with a lateral projecting boss 31G and complementary socket 31H so that the auxiliary holder may be detachably connected to the basic holder or to each other as schematically demonstrated in FIG. 13.

Included in the set of the device set of this invention are a series of pegs 32 which are adapted to be received in the respective receptacles of the individual holders 30 or 31. As shown, the pegs 32 consist of a stem portion 32A which is adapted to receive in the receptacles or holes of the respective holders, and an enlarged head portion 32B which is adapted to extend upwardly from the upper surface of the holder. The pegs 32 may be made of any suitable material, but preferably plastic. Thus, it will be noted that with the stem of the pegs inserted in the receptacles of the holders, the head of the peg will extend above the holder so as to be readily viewed or touched, thus giving a discrete object which can be counted or visualized by the students. If desired, the pegs 32 can be made in two colors for use in sign number situations to indicate as for example, positive or negative properties of numbers.

Included in the set are a series of blanking or flat headed plugs 33. The blanking or flat headed plugs 33, as illustrated in FIG. 6, are comprised essentially of a flat head 33B with a depending stem portion 33A adapted to be received in the holes 30F or 31F of the respective holders 30, 31. The arrangement is such that with the flat head or blanking plug 33 positioned in a receptacle of a given holder, the head 33B of the plug is rendered substantially flush with the upper surface of the holder. The holder may be recessed to achieve this. Thus, the blanking or flat headed plug 33 serves as a means for blanking out a given hole. To distinguish the blanking or flat headed plug 33 from the head of the pegs 32, the former are illustrated as being rectangular in the drawings as shown in FIGS. 6, 10, and 11 for example. However, as an alternate construction, the blanking flat heads of plugs 33' may be round as shown in FIG. 7.

Figure 22:
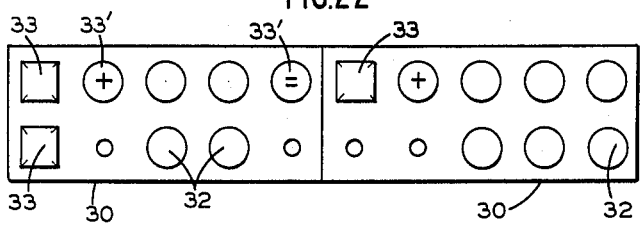
FIGURE 22 illustrates the utilization of the component parts of the instant device for teaching and illustrating number sentences, as for example, equations.
Figure 23:
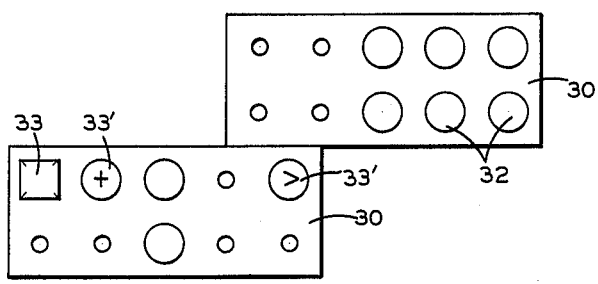
FIGURE 23 illustrates the utilization of the respective component parts of the instant visual educational device for illustrating inequalities.

Several of the blanking flat headed plugs 33' may have inscribed on the head portion thereof various mathematical symbols. For example, as shown in FIG. 7 the flat heads of plugs 33' may have inscribed thereon the plus or minus sign and the like. Also, if desired, various number or letter indications may also be inscribed on some of the heads of plugs 33'. Other heads of the blanking plugs 33' may be left unmarked as shown by the middle head of FIG. 7. The blanking plugs 33 or 33' with the unmarked heads 33B are primarily used to adapt the basic holder for use to illustrate different system of numerations, as for example, a given member to given base, as illustrated in FIGS. 10, 11 and 13, for example. The plugs 33 which had their heads marked with numerals are adapted for use in writing arithmetic problems and/or as co-ordinates of a number line as shown in FIG. 14, 17 and 19. Still other plugs, which had their heads marked with mathematical symbols, may be used in setting up various problems and equations or the like as seen in FIGS. 22 and 23.

Also included in the set are a plurality of elastic or rubber band components 34. Preferably the rubber bands are used for grouping. The bands, if desired, can be made in different colors, each color representing a different operation such, as for example, addition, subtraction, multiplication, and with still a different color to be used for grouping (symbols of inclusions) e.g. to simulate parentheses.

From the foregoing, it will be readily noted that the individual components 30 to 34 of the instant visual educational device are relatively simple in structure, they can be readily connected and disconnected from one another to form numerous and various aid boards for illustrating and demonstrating the various mathematical operations and concepts. For example, the above described component parts of the described visual educational device may be utilized to demonstrate place value. For example, FIG. 9 illustrates the utilization of the component parts of the instant educational device to explain the function of the holders in teaching numeration wherein the problem illustrated is to tally 13 to a base 10 in accordance with the following equation: $B = A_4B^4 + A_3B^3 + A_2B^2 + A_1B^1 + A_0B^0$. Thus, from the foregoing, it will be noted that by utilizing two basic holders 30, and by utilizing the pegs 32 as tallies, the holes 30F of the respective holders 30 are filled until the thirteen tallies 32 have been used up. Thus, it then becomes apparent with the visual aid of this invention that the numeral for thirteen tallies is $1(10) + 3(1)$ or 13 in base 10.

To illustrate what the numeral of thirteen tallies is in base 8 as in FIG. 10, it is again necessary to utilize two basic holders 30 in which the respective holders 30 are adapted for base 8 numeration by the utilization of two flat plugs 33 to blank out two receptacle positions in each of the respective basic holders 30 as is indicated by the square heads of the flat plugs of FIG. 10. Thus, by utilizing pegs 32 again as the tallies, it is readily apparent that by occupying each of the receptacles in the respective holders, the numeral for 13 tallies is 15 in base 8 or $1(8) + 5(1)$.

To illustrate what the 13 tallies would be to the base 7, the same procedure is followed as described above with the exception that three of the receptacles of the respective base holders 30 are blocked off by a flat blanked plug 33 as indicated by the square heads in FIG. 11. Thus each holder now represents a base 7. To illustrate how the 13 tallies would be expressed in base 7, the student need only to insert the 13 pegs into the respective receptacles of the basic holders. Upon exhausting the thirteen tallies it can be readily observed that 13 in base 7 is written 16. From the foregoing it follows that each time all of one holder is filled, it equals unity or one, and the leftover tallies in the other holder constitute the fractional part thereof.

To illustrate the same 13 tallies to base 12, an auxiliary holder 31 must be connected to a basic holder 30 so as to provide the base 12. Thus, of the 13 tallies, 12 are utilized to occupy the receptacles of the first unit of combined holders 30, 31 with the leftover tally being positioned in one of the receptacles of the other combined unit holder. Thus, it will be readily apparent that 13 tallies to the base 12 equals 11.

FIGURE 13 illustrates the utilization of the component parts of the instant invention to illustrate 13 tallies in base 2. In this instance, it will be noted that in accordance with the place value formulae it is necessary to use a basic holder 30 having two of its receptacles blanked off, or a plurality of auxiliary holders 31, for example, four of the auxiliary holders to form the eight holder, two connected auxiliary holders 31 to define the four holder, and individual holders 31 for the next two places. Therefore, in accordance with the above noted equation, it will be noted that 13 tallies in base 2 equals 1101. Thus, it will be apparent that with the construction of the basic holder 30 and the auxiliary holder 31, and the complementary interlocking means therefor, together with the respective pegs and plugs allows for the consideration of a number to any base. For example, by the interlocking of 10 basic holders 30 a 100 value holder can be formed for allowing the demonstration of a number 142 when used with the necessary basic ten holders.

FIGURE 14 illustrates the interlocking of a predetermined number of basic holders in end to end relationship to form an aid which may be used as a modified number line or number scale. As shown, the top row of receptacles of the aid so formed may be used for receiving plugs 32 which are marked with numerals to thereby label the respective corresponding receptacles of the bottom row which actually forms the line or scale. In the illustrated embodiment, it will be noted that the number scale run positive and negative to either side of zero. Consequently, many topics of elementary mathematics, such as operations with positive and negative numbers, ordinal numbers, the subject of fractions, and the graphing of equations in one variable, can be illustrated by using this structure. For example, the illustrated embodiment of FIG. 14 illustrates a graph of the equation, $X^2=9$. The answer is shown in FIG. 14 with one peg 32 located in the $-3$ receptacle and the other peg in the $+3$ receptacle. Thus, the novelty of this double row arrangement and the use of the removable plugs 33 marked with the numerals allows a student to decide on a unit length and to label the number line in a suitable fashion for any particular problem. This is particularly advantageous in the subject of fractions. The interlocking feature of the basic holders 30 to form this structure permits its extension to any desired length and thereby allows complete freedom in the selection of problems for a student's consideration.

The respective holders may also be interlockingly connected in any desired combination so as to provide arrangements to illustrate many other mathematical concepts. The important feature of this construction is that it permits the aids to be adjusted to any size and/or shape. Therefore, by the use of interlocking holders 30 or 31, many arrangements are possible to result in the most efficient aid for any given problem.

The respective holders may also be interlockingly connected in any desired combination so as to provide arrangements to illustrate many other mathematical concepts. The important feature of this construction is that it permits the aids to be adjusted to any size and/or shape. Therefore, by the use of interlocking holders 30 or 31, many arrangements are possible to result in the most efficient aid for any given problem.

For example, in the very early primary grades, children can be first taught counting by asking them to count the number of holes in the basic holder 30, and to insert therein a given number of pegs 32, as shown in FIGS. 15 and 16 so that the child familiarizes himself with a given number by actually touching a tangible object. Number recognition is also possible by the use of the instant device in the very early primary grades. By the use of a given number of pegs 32 and the numbered plugs 33 corresponding thereto a child can receive actual experience in associating a given number of tallies with an actual written numeral. For example, as shown in FIG. 17, visual aid device is readily utilized for this numeral recognition. As shown, recognition of numeral 5 is taught by the placing of five pegs into one of the basic holders 30 and inserting adjacent thereto a flat plug 33' marked with the numeral five on the head thereof. Thus, the child will readily associate the five distinct pegs 32 with the numeral five. Thus, by various combination of pegs 32 with numbered flat plugs 33, a child can readily associate tangible units with an intangible numeral.

Also, the components of the instant educational device may be utilized for performing basic mathematical operations. For example, FIG. 18 illustrates that by the use of two or more interlocking basic holders 30, an aid can be constructed in various sizes to demonstrate basic operations. In the arrangement shown in FIG. 18, two basic holders 30 are interconnected to illustrate the basic operation of adding 4 and 8. In this form the rubber band 34 of a given color is used as the operation symbol of addition to separate 4 pegs 32 which are to be added to 8 pegs 32. The young child can then readily calculate the answer. For subtraction, an elastic band of a different color may be interposed between the grouping of four and eight pegs. From the foregoing, it will be readily apparent that by merely interposing different colored bands between the respective peg grouping different operations may be represented thereby.

FIGURE 19 illustrates the utilization of the respective component parts of the instant educational device to effect recognition of basic operations, written with numerals and operational symbols. As shown in FIG. 19, three basic holders 30 are connected together in the manner illustrated. The upper two holders, for example, may be set up to illustrate a certain basic operation, as for example, the addition of 4+8 in the manner described with reference to FIG. 18. Recognition of this operation with written numerals can then be established by utilizing the flat head plugs 33 with identifying numerals 4 and 8 disposed directly beneath the respective grouping of the pegs 32 corresponding thereto. Utilization of a flat head plug 33' having the plus symbol is disposed in place of the colored band. Thus, by association, a student in the primary grades can readily determine the recognition of the basic operation written with numerals and the operational symbols. Thus, an important feature for the instant invention is that a student may arrange the respective holders and the associated component parts thereof in any given arrangement so as to construct a very efficient board or aid for indicating a given problem. Therefore, the space and board area to illustrate a given problem is required by the instant construction.

FIGURE 20 illustrates the manner in which the component parts of the instant visual educational device may be utilized to form a co-ordinate plane for teaching analytical geometry and the like. In the illustrated embodiment, a series of basic holders 30 are connected in side by side and end to end relationship to establish a relatively large rectangular plane. As shown, the co-ordinate X and Y axes are formed by interposing a pair of vertically aligned pegs 32 and a pair of horizontally aligned pegs in which the respective pegs are encircled by an elastic band 34. With the arrangement defined, it is readily apparent that any point can now be plotted by interposing a peg at any of the given points relative to the set of co-ordinate axes thus established.

FIGURE 21 illustrates the utilization of the respective components of the instant visual educational device to illustrate the field properties of numbers. The associative property $(A+B)+C=A+(B+C)$ is illustrated. For example, by assigning a given number to the above formula, as for example, $A=3$, $B=2$, and $C=4$, it will be noted that the problem can be set up by interposing the necessary pegs 32 into the receptacles of the holders 30 wherein the substituted pegs can be grouped according to operation by a given color band 34, e.g. green, and grouped to properties by parentheses or bands 34A of another color.

FIGURE 22 illustrates the utilization of the respective components for illustrating number sentences for any appropriate grade level. In the illustrated arrangement, holders 30 are utilized to illustrate the equation, as for example, $2X+4=X+6$. In this instance the flat head plugs 33 are used to illustrate the variables, whereas the pegs 32 are used for the constants. Therefore, as shown in FIG. 22, two of the flat plugs 33 are interposed in their respective receptacles to show the variable and four pegs 32 are interposed in adjacent receptacles to indicate the constants on one side of the equation. On the other side of the equation, the same set up is followed. Thus, a student can readily visualize the makeup of such linear equation. The components of the instant visual device are also useful in illustrating inequalities, as for example, $Y+2$ is greater than 6. This problem is set up in FIG. 22. It will be noted that the holders 30 interlocked at the same level as in FIG. 22 can be utilized to show balance or equality, whereas the holders, as shown in FIG. 23 interlocked one above the other may be used to show the unbalance or inequality. The variable is again shown by the flat headed plug 33.

FIGURE 24 illustrates the manner in which several of the respective basic holders 30 may be interlocked to set up a board or aid for use in illustrating geometric models. Because of the interlocking relationship of the respective holders, it will be apparent that the board or aid can be set up to any appropriate size by utilizing a number of holders necessary for making up a given size board. The geometric figures can then readily be formed then by interposing pegs 32 at any desired location with the geometric figure completed by circumscribing a rubber band 34 about the given points identified by the pegs as shown in FIG. 24. Thus, the constructed triangle is defined by the pegs located at three points and encircled by a rubber band.

It will also be readily noted that the holders may be utilized to illustrate units and fractional parts thereof. For example, a whole or unit may be made up of say six basic holders fastened together. Therefore, to illustrate what part 1/6 is of the whole unit, one of the holders is removed. Thus a student can readily comprehend that the removal of one of the holders constitutes a sixth or a fractional part of the whole unit defined thereby.

From the foregoing description, it will be readily apparent that the respective component parts of the instant visual aid device can be adapted to illustrate a variety of mathematical concepts, functions and operations, and that each of the respective operations may be illustrated with only those components which are necessary for carrying out the operation. In this manner, a child or student is not confused or encumbered by manipulating relatively large boards or fields which are not required or essential for illustrating many of the basic mathematical functions or concepts. Therefore, it will be noted that the arrangement of the component parts of the instant visual aid device facilitates its handling by a student. This is an important consideration when the device is used by small children. The physical structure of the component parts can be readily identified. With the instant aid, the comprehension and appreciation of the basic mathematical concepts can be readily comprehended in a minimum of time, with a maximum of ease, and with a maximum of enjoyment.

From the foregoing, it will be readily noted that the heretofore cumbersome, tedious, and exasperating method of teaching basic mathematical concepts, operations, and functions is obviated by the instant device, and thereby results in a much more convenient, comprehendable and more enjoyable manner of instructing. The student, particularly the lower grade students can fully appreciate and feel with more of his senses the pleasures in discovering and/or practicing various mathematic operations.

While the instant invention has been disclosed with reference to a particular embodiment thereof, it is to be appreciated that the invention is not to be taken as limited to all of the details thereof, as modifications and variations thereof may be made without departing from the spirit or scope of this invention.

What is claimed is:
1. A mathematical device for visibly illustrating various mathematical operations including the illustrations of place value in teaching numeration of numbers to a given base including the base 12 comprising,
  (a) a plurality of similar basic holders,
  (b) each of said holders including a rectangular block having a series of receptacles disposed in two rows on said block, each row including five receptacles, each being disposed in a side-by-side relationship, said receptacles being uniformly spaced thereon,
  (c) said block having opposed edge portions, and
  (d) said blocks each having complementary interlocking means formed on the respective edge portions thereof whereby said blocks can be detachably connected one to another,
  (e) a series of indicia means adapted to be inserted into the receptacles of said blocks to set up various mathematic operations,
  (f) a plurality of similarly made auxiliary holders, each of said auxiliary holders having a pair of receptacles only formed therein,
  (g) and said auxiliary holders having complementary interlocking means for detachably connecting the same to said basic holders whereby said basic holder and auxiliary holder are disposed in a common plane wherein the receptacles in said basic holder and said auxiliary holder are disposed in alignment in the assembled position thereof.

2. A set of instructional devices for aiding students to visualize and understand various mathematic operations including place value for teaching numerations of a number to a given base including base 12, number line, counting, number recognition, the basic mathematical operations, a co-ordinate plane for teaching analytic geometry, number sentences, geometry, and units and fractions, comprising,
  (a) a plurality of similarly constructed basic holders,
  (b) complementary means formed on each of said holders for detachably interlocking said holders to one another to form various aid boards for visually illustrating the various mathematical operations,
  (c) each of said holders having two spaced rows of receptacles formed thereon, each row having five receptacles equidistantly spaced in side-by-side relationship thereon,
  (d) a plurality of auxiliary holders having a pair of receptacles therein, said pair of receptacles being spaced in side-by-side relationship a distance sufficient to place the same in line with the respective rows of receptacles on said basic holder when said auxiliary holder is connected to said basic holder.
  (e) said auxiliary holders having complementary interlocking means for detachably connecting the same to said basic holder and/or to each other whereby said basic holder and auxiliary holder are disposed in a common plane,
  (f) a series of blank plugs adapted to be received in said receptacles for setting up said aid boards for the performing of various of said operations,
  (g) a series of peg means adapted to be received in said receptacles, said peg means each having a head arranged to extend above the surface of said holders, and
  (h) several of said blank plugs having a mathematical symbol formed on the ends thereof.

3. The invention as defined in claim 2 and
  (a) including a plurality of elastic bands for grouping said peg means.

4. A set of instructional devices for aiding student visualize and comprehend various mathematical operations including place value for teaching numerations of a number to a given base including a base 12, number line, counting, number and numeral recognition, the basic math operations, analytic geometry, equations, geometry, and units and fractions comprising, (a) a plurality of similar basic holders, (b) each of said holders including a block having opposed longitudinally extending side wall portions and transversely extending end wall portions, (c) complementary means formed on each of said holders for detachably interlocking said holder to one another either in end to end or side by side relationship to form an aid board for illustrating any of said mathematical operations, (d) said complementary means including a male member projecting outwardly of one of said side wall portions and end wall portions, and a complementary female means formed in the other side wall portion and end wall portion adapted to receive a corresponding male member of another holder, (e) each of said holders having two spaced rows of receptacles formed in the upper surface of said blocks, each of said rows having five equidistantly co-axially spaced receptacles therein whereby the receptacles of said spaced rows are disposed in a side-by-side relationship, (f) a plurality of auxiliary holders, (g) each of said auxiliary holders including a block having opposed longitudinal side walls and transverse end walls, (h) each of said auxiliary holders having complementary interlocking means for detachably connecting the same to said basic holder and/or to each other whereby said basic holder and auxiliary holder are joined in a common plane, the receptacles in said auxiliary holder being disposed in alignment with the adjacent receptacles in said basic holder when joined, (i) a series of peg means adapted to be received in the receptacles of said holders for setting up a mathematical operation, (j) a series of blanking plugs adapted to be received in said receptacles, said blank plugs each having a flat head arranged to lie substantially flush with the surface of said holders to block one of said receptacles, and (k) means defining an identifying indica formed on the heads of some of said blanking plugs.

References Cited by the Examiner

UNITED STATES PATENTS

| 2,482,227 | 9/1949 | Towne | 35—31.4 X |
| 2,948,488 | 5/1961 | Kirchner | 35—73 |
| 3,094,792 | 6/1963 | Morgan et al. | 35—31 |

FOREIGN PATENTS

| 1,007,998 | 2/1952 | France. |
| 583,152 | 11/1933 | Germany. |
| 1,069,912 | 11/1959 | Germany. |
| 5,008 | 6/1900 | Great Britain. |
| 3,476 | 6/1919 | Netherlands. |

EUGENE R. CAPOZIO, *Primary Examiner.*

LAWRENCE CHARLES, JEROME SCHNALL,
*Examiners.*